US007463707B2

(12) United States Patent
Dale et al.

(10) Patent No.: US 7,463,707 B2
(45) Date of Patent: Dec. 9, 2008

(54) UPSTREAM FREQUENCY CONTROL FOR DOCSIS BASED SATELLITE SYSTEMS

(75) Inventors: Mark Dale, Laguna Hills, CA (US); Dorothy D. Lin, Laguna Beach, CA (US); Alan Gin, Corona Del Mar, CA (US); David L. Hartman, Laguna Hills, CA (US); Rocco J. Brescia, Jr., Newport Coast, CA (US); Ravi Bhaskaran, Irvine, CA (US); Jen-chieh Chien, Lake Forest, CA (US); Adel Fanous, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 676 days.

(21) Appl. No.: 10/352,244

(22) Filed: Jan. 28, 2003
(Under 37 CFR 1.47)

(65) Prior Publication Data
US 2004/0042574 A1    Mar. 4, 2004

Related U.S. Application Data

(60) Provisional application No. 60/407,308, filed on Sep. 3, 2002.

(51) Int. Cl.
*H04L 7/00* (2006.01)
*H03D 3/24* (2006.01)
(52) U.S. Cl. .................................... 375/356; 375/373
(58) Field of Classification Search ................. 375/354, 375/371, 373, 376, 355, 356; 455/71
See application file for complete search history.

(56) References Cited

U.S. PATENT DOCUMENTS

| | | | |
|---|---|---|---|
| 4,014,166 A | * | 3/1977 | Cateora et al. ................. 368/28 |
| 5,392,450 A | | 2/1995 | Nossen |
| 5,511,079 A | | 4/1996 | Dillon |
| 5,625,624 A | | 4/1997 | Rosen et al. |
| 5,878,330 A | * | 3/1999 | Naumann ..................... 455/71 |
| 6,070,074 A | | 5/2000 | Perahia et al. |
| 6,108,317 A | | 8/2000 | Jones et al. |
| 6,108,561 A | | 8/2000 | Mallinckrodt |
| 6,169,728 B1 | | 1/2001 | Perreault et al. |
| 6,249,526 B1 | | 6/2001 | Loukianov |
| 6,356,740 B1 | * | 3/2002 | Malcolm et al. .............. 455/71 |
| 6,411,806 B1 | | 6/2002 | Garner et al. |
| 6,459,703 B1 | | 10/2002 | Grimwood et al. |
| 6,594,467 B2 | | 7/2003 | Asia et al. |
| 6,625,118 B1 | | 9/2003 | Hadi Salim et al. |

(Continued)

*Primary Examiner*—David B Lugo
(74) *Attorney, Agent, or Firm*—Sterne, Kessler, Goldstein & Fox PLLC

(57) ABSTRACT

A system and method for minimizing the frequency error of satellite modem signals at a satellite gateway. The gateway downstream baud (symbol) clock and the elements that control the upstream frequency (i.e., local oscillators in the conversion chain, A/D sample clocks) are locked to a common frequency reference. The gateway sends upstream satellite frequency offset information, such as satellite ephemeris data from which to calculate Doppler offset, to the satellite modem. The satellite modem locks the frequency of the satellite modems master oscillator to the recovered baud rate using a frequency locked loop. The satellite modem uses its master oscillator as the carrier reference for the upstream frequency up conversion. The satellite modem uses or calculates the upstream satellite frequency offset and compensates for this offset by shifting its center frequency.

22 Claims, 6 Drawing Sheets

U.S. PATENT DOCUMENTS

| | | |
|---|---|---|
| 6,690,655 B1 | 2/2004 | Miner et al. |
| 6,741,555 B1 | 5/2004 | Li et al. |
| 6,742,187 B1 | 5/2004 | Vogel |
| 6,801,537 B1 | 10/2004 | Kubbar |
| 6,804,532 B1 | 10/2004 | Moon et al. |
| 6,807,193 B1 | 10/2004 | Beser |
| 6,853,680 B1 | 2/2005 | Nikolich |
| 6,987,741 B2 | 1/2006 | Kelly et al. |
| 7,139,247 B2 | 11/2006 | Desai et al. |
| 7,145,888 B2 | 12/2006 | Dale et al. |
| 7,203,158 B2 | 4/2007 | Oshima et al. |
| 2001/0038620 A1 | 11/2001 | Stanwood et al. |
| 2002/0009051 A1 | 1/2002 | Cloonan |
| 2002/0021678 A1 | 2/2002 | Heatwole et al. |
| 2002/0021711 A1 | 2/2002 | Gummalla et al. |
| 2002/0031120 A1 | 3/2002 | Rakib |
| 2002/0036985 A1 | 3/2002 | Jonas et al. |
| 2002/0061753 A1 | 5/2002 | Lyseijko et al. |
| 2002/0073432 A1 | 6/2002 | Kolze |
| 2002/0080816 A1 | 6/2002 | Spinar et al. |
| 2002/0154620 A1 | 10/2002 | Azenkot et al. |
| 2003/0021365 A1 | 1/2003 | Min et al. |
| 2003/0026283 A1 | 2/2003 | Currivan et al. |
| 2003/0058794 A1 | 3/2003 | Cantelias et al. |
| 2003/0069926 A1 | 4/2003 | Weaver et al. |
| 2003/0147411 A1 | 8/2003 | Goosman |
| 2004/0017830 A1 | 1/2004 | Dale et al. |
| 2004/0146038 A1 | 7/2004 | Dale et al. |
| 2004/0162020 A1 | 8/2004 | Dale et al. |
| 2005/0063487 A1* | 3/2005 | Sayegh ........................ 375/316 |
| 2007/0147281 A1 | 6/2007 | Dale et al. |

* cited by examiner

UPSTREAM FREQUENCY CONTROL FOR DOCSIS BASED SATELLITE SYSTEMS

CROSS-REFERENCE TO RELATED APPLICATIONS

This application claims priority to U.S. Provisional Application Ser. No. 60/407,308, entitled, "Upstream Frequency Control for DOCSIS Based Satellite Systems," filed Sep. 3, 2002, which is incorporated herein by reference in their entirety.

BACKGROUND OF THE INVENTION

1. Field of the Invention

The present invention is generally related to broadband communications systems. More particularly, the present invention is related to broadband communications systems that use Data Over Cable Service Interface Specification (DOCSIS) or any of its derivatives.

2. Background Art

In DOCSIS related broadband communications architectures, data is transferred between a central location and many remote subscribers. The central location may be referred to as a Headend for cable systems, a wireless access termination system (WATS) for broadband terrestrial fixed wireless systems, or a satellite gateway for two way satellite systems. Subscriber equipment may be referred to as a cable modem (CM) for cable systems, a wireless modem (WM) for broadband terrestrial fixed wireless systems, or a satellite modem (SM) for two way satellite systems.

In a two-way satellite system, the communication path from the satellite gateway to the SM is called the downstream and the communication path from the SM to the satellite gateway is called the upstream. Satellite modems share a continuous downstream using time domain multiplexing (TDM). Individual satellite modems share a given upstream channel using time domain multiple access (TDMA) techniques.

In standard DOCSIS based systems, upstream frequency control is achieved and maintained as part of the initial and station maintenance DOCSIS mechanisms respectively. As part of the registration process, a cable modem transmits a range request burst during an initial maintenance window. The headend measures the initial frequency offset of the cable modem and sends frequency offset adjustment information back to it as part of a range response message. In DOCSIS based cable applications, the upstream transmit frequency is in the range of 5-65 MHz. Upstream channel bandwidths can be as small as 200 KHz (DOCSIS bandwidth options are 200, 400, 800, 1600 and 3200 KHz). Use of relatively low transmit frequencies insures that the initial frequency offset is small relative to the channel bandwidth. This allows the headend to receive and process the initial range request message. For example, an initial frequency uncertainty of 10 parts per million implies a 650 Hz error on a 65 MHz carrier. Thus, 650 Hz is well within the smallest DOCSIS upstream channel bandwidth of 200 KHz.

In satellite applications, the upstream transmit frequencies are much higher. Typical applications might use Ku band (approximately 14 GHz) or Ka band (approximately 30 GHz). Use of high frequency components introduces higher initial frequency uncertainty. For example an initial frequency uncertainty of 20 parts per million (PPM) implies a 280 KHz error on a 14 GHz carrier and 600 KHz error on a 30 Ghz carrier. These errors may result in a signal being received in a neighboring channel for the smaller DOCSIS upstream channel bandwidths. Such errors are far too large for the use of standard DOCSIS based techniques for initial frequency acquisition and correction at the gateway.

Thus, what is needed is a mechanism whereby initial frequency error of the satellite modem can be controlled and corrected with sufficient accuracy to allow the gateway to receive initial maintenance bursts from the satellite modems with small offsets from the desired frequency.

BRIEF SUMMARY OF THE INVENTION

The present invention solves the above mentioned problems by providing a system and method for minimizing the frequency error of satellite modem signals at a satellite gateway. The satellite gateway downstream baud (symbol) clock and the elements that control the upstream frequency (i.e., local oscillators in the conversion chain, A/D sample clocks) are locked to a common frequency reference. The satellite gateway sends upstream satellite frequency offset information, such as, for example, satellite ephemeris data from which to calculate Doppler offset, to the satellite modem. The satellite modem locks the frequency of each satellite modem's master oscillator to the recovered baud rate using a frequency or phase locked loop. The satellite modem uses its master oscillator as the carrier reference for the upstream frequency up-conversion. The satellite modem uses or calculates the upstream satellite frequency offset and compensates for this offset by shifting its center frequency.

Further embodiments, features, and advantages of the present invention, as well as the structure and operation of the various embodiments of the present invention, are described in detail below with reference to the accompanying drawings.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the pertinent arts to make and use the invention.

Figure 1:
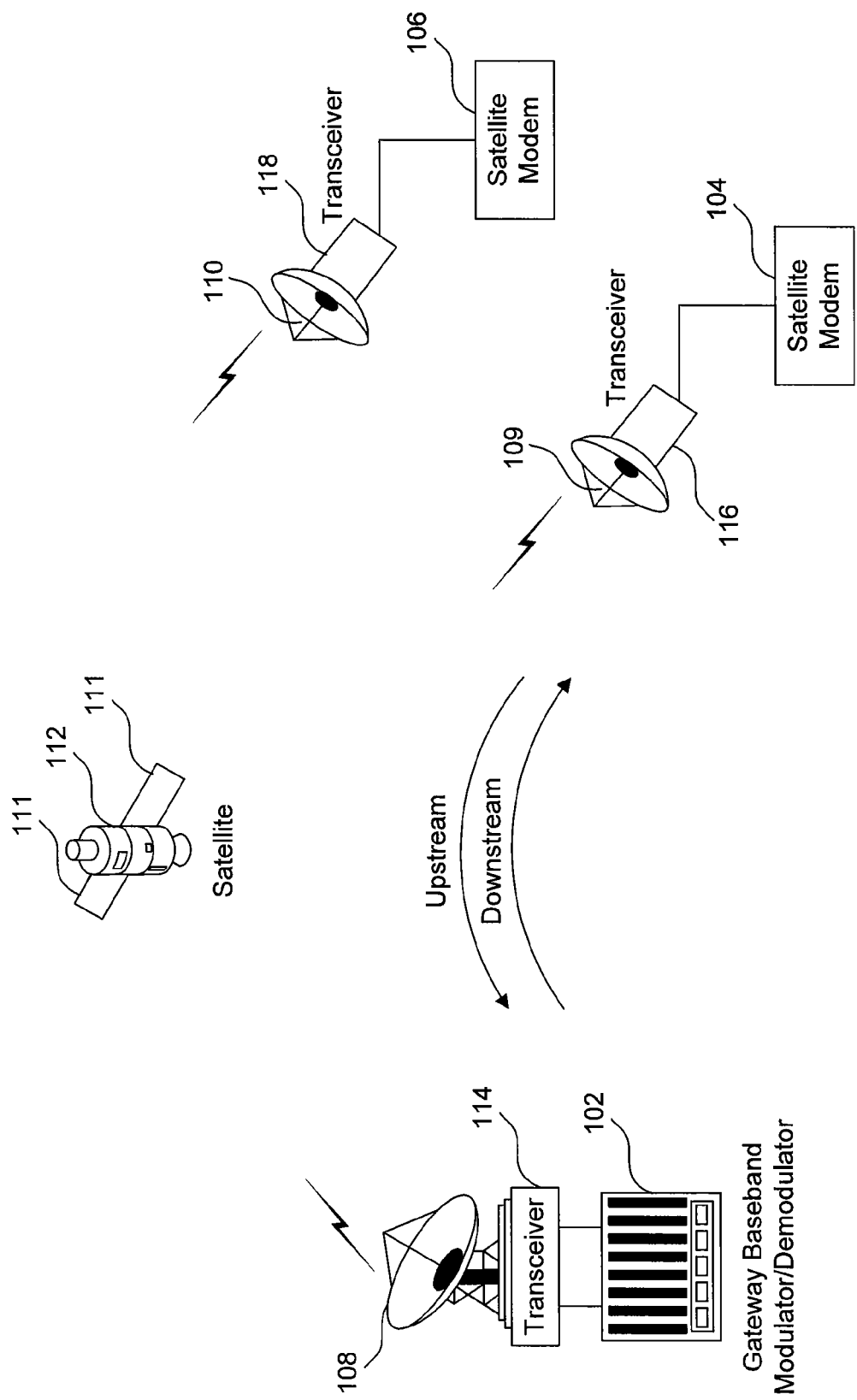
FIG. 1 is a high level block diagram of an exemplary broadband two-way satellite communications system in accordance with embodiments of the present invention.

The features and advantages of the present invention will become more apparent from the detailed description set forth below when taken in conjunction with the drawings and which like reference characters identify corresponding elements throughout. In the drawings, like reference numbers generally indicate identical, functionally similar, and/or structurally similar elements. The drawings in which an element first appears is indicated by the left most digits in the corresponding reference number.

DETAILED DESCRIPTION OF THE INVENTION

While the present invention is described herein with reference to illustrative embodiments for particular applications, it should be understood that the invention is not limited thereto. Those skilled in the arts with access to the teachings provided herein will recognize additional modifications, applications, and embodiments within the scope thereof and additional fields in which the present invention would be of significant utility.

Overview

FIG. 1 is a high level block diagram of an exemplary broadband two-way satellite communications system 100 in accordance with embodiments of the present invention. Although the present invention is described using a broadband two-way satellite communications system, the present invention is also applicable to other broadband communications systems. Such systems may include, but are not limited to, broadband cable systems and broadband terrestrial fixed wireless systems. Broadband two-way satellite communications system 100 enables voice communications, video and data services based on a bi-directional transfer of packet-based traffic between a satellite gateway 102 and one or more satellite modems (SM), such as satellite modems 104 and 106, via a satellite 112. Satellite 112 is a vehicle or platform designed to orbit the earth. Satellite 112 contains electronic devices for originating and/or relaying telecommunications, data, etc. between satellite gateway 102 and one or more satellite modems, such as SMs 104 and 106. For example, in an embodiment of the present invention, satellite 112 receives packet-based traffic from satellite gateway 102 and relays such traffic to one or more satellite modems, such as satellite modems 104 and 106. Satellite 112 also receives packet-based traffic from satellite modems, such as satellite modems 104 and 106, and sends such traffic to satellite gateway 102. Although broadband two-way satellite communications system 100 is shown with only two satellite modems, any number of satellite modems may be included in the broadband two-way satellite communications system 100 of the present invention.

Bi-directional transfer of packet-based traffic is achieved using antennas, such as antennas 108, 109, 110, and 111, and transceivers 114, 116 and 118. Satellite 112 is coupled to antennas 111 for receiving and transmitting information. Antenna 108 is coupled to satellite gateway 102 via transceiver 114 for transmitting/receiving packet-based traffic to/from SMs 104 and 106, respectively, via satellite 112. Antennas 109 and 110 are coupled to SMs 104 and 106 via transceivers 116 and 118, respectively, for transmitting/receiving packet-based traffic to/from satellite gateway 102, via satellite 112. The communication path from satellite gateway 102 to satellite modems 104 and 106 is called the downstream. The communication path from satellite modems 104 and 106 to satellite gateway 102 is called the upstream.

Satellite gateway 102 is a central distribution point for broadband two-way satellite communications system 100. Satellite gateway 102 manages the upstream and downstream transfer of data between satellite gateway 102 and satellite modems, such as satellite modems 104 and 106, via satellite 112. Satellite gateway 102 broadcasts information downstream to satellite modems 104 and 106 as a continuous transmitted signal in accordance with a time division multiplexing (TDM) technique. Satellite gateway 102 also controls the upstream transmission of data from satellite modems 104 and 106 to satellite gateway 102 by assigning to each satellite modem (104 and 106) slots within which to transfer data in accordance with a time domain multiple access (TDMA) technique. Thus, each satellite modem (104 and 106) sends information upstream as short burst signals during a transmission opportunity allocated by satellite gateway 102.

Each of satellite modems 104 and 106 operates as an interface to a user device (not shown). User devices may include, but are not limited to, personal computers, data terminal equipment, telephony devices, broadband media players, personal digital assistants, network-controlled appliances, or any other device capable of transmitting or receiving data. Satellite modems 104 and 106 perform the functions necessary to convert downstream signals received over broadband two-way satellite communications system 100 into data packets for receipt by an attached user device. Satellite modems 104 and 106 perform the functions necessary to convert data signals received from the user devices into upstream burst signals suitable for transfer over broadband two-way satellite communications system 100.

In exemplary broadband two-way satellite communications system 100, satellite modems 104 and 106 operate in formats that adhere to the protocols set forth in the DOCSIS specification as well as proprietary protocols that extend beyond the DOCSIS specification. Additionally, satellite gateway 102 operates to transmit, receive and process data transmitted to it in accordance with the protocols set forth in the DOCSIS specification and can also operate to transmit, receive and process data packets that are formatted using proprietary protocols that extend beyond those provided by the DOCSIS specification.

A Mechanism for Minimizing Frequency Error of Satellite Modem Signals at the Satellite Gateway The present invention is a system and method for minimizing the frequency error of satellite modem signals at a satellite gateway, such as satellite gateway 102. The invention accomplishes this by modifying satellite gateway 102 and the satellite modems, such as satellite modems 104 and 106, in a standard DOCSIS system. The process for accomplishing the present invention will now be described with respect to FIGS. 2-5. The downstream process will be described first, followed by a description of the upstream process.

Figure 2:
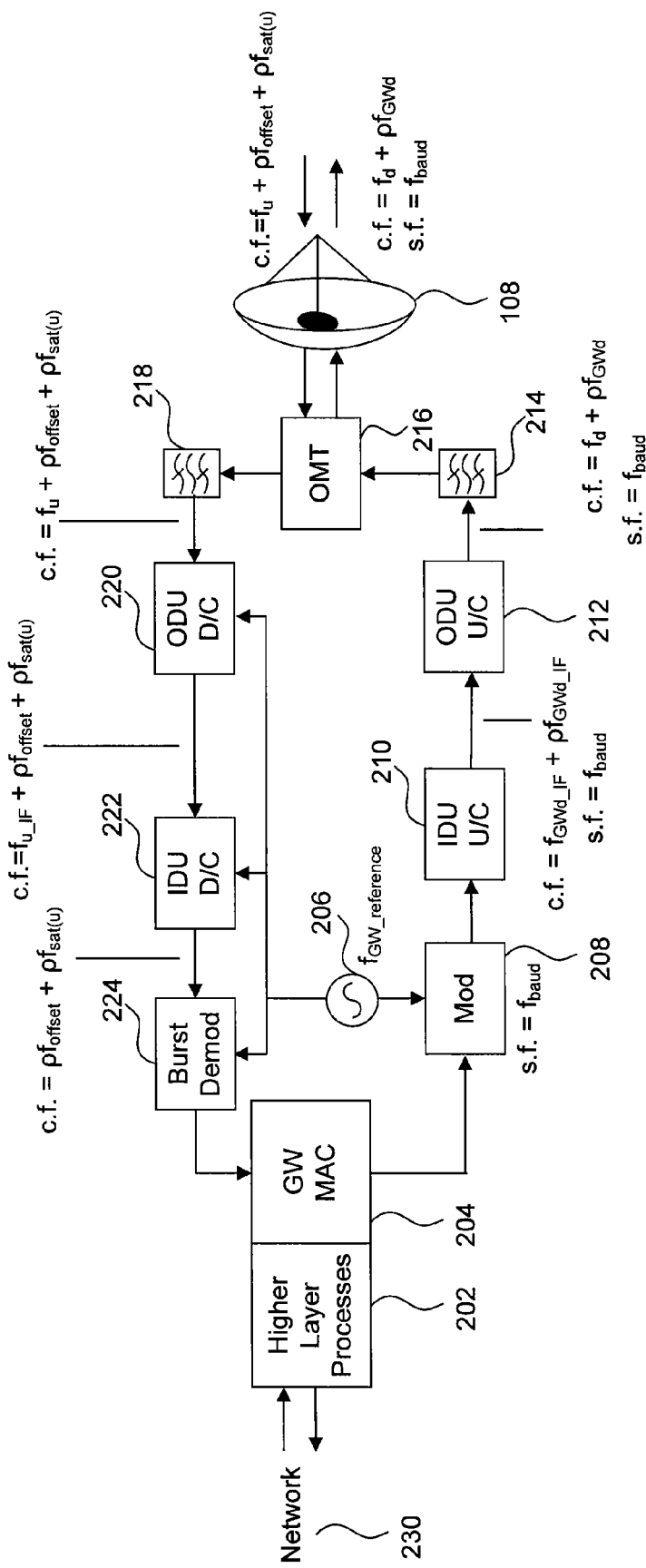
FIG. 2 is a block diagram illustrating the processing blocks for a satellite gateway.

FIG. 2 is a block diagram 200 illustrating processing blocks for satellite gateway 102. FIG. 2 also illustrates the relevant upstream and downstream frequencies associated with each processing block. The processing blocks for satellite gateway 102 include a higher layer processing block 202, a gateway media access control (GW MAC) layer 204, an oscillator 206, a downstream modulator 208, an indoor unit upconverter 210, an outdoor unit upconverter 212, a downstream filter 214, an ortho mode transducer 216, antenna 108, an upstream filter 218, an outdoor unit downconverter 220, an indoor unit downconverter 222, and a burst demodulator 224.

Oscillator 206 generates a master reference frequency. The master reference frequency acts to define a time reference as well as provide a definition of frequency for the system. Oscillator 206 is coupled to downstream modulator 208, outdoor unit downconverter 220, indoor unit downconverter 222, and burst demodulator 224 to frequency-lock each of these components to the master reference frequency. In an alternative embodiment, an external source could be used to provide the master reference frequency.

Higher layer processing block 202 may include, but is not limited to, a network layer processing block for establishing, maintaining, and terminating logical and physical connections between an external network 230. Thus, higher layer processing block 202 acts as an interface to external network 230. Higher layer processing block 202 also interfaces with GW MAC layer 204. Higher layer processing block 202 receives data from GW MAC layer block 204 via satellite modems 104 and 106 for transmission to external network 230. Higher layer processing block 202 also receives data from external network 230 for transmission to satellite modems 104 and 106 via GW MAC layer block 204. External network 230 may be, but is not limited to, a packet-switched network.

GW MAC layer 204 processes incoming data from external network 230 for downstream transmission to one or more satellite modems, such as satellite modems 104 and 106. GW MAC layer block 204 also processes outgoing data received from one or more satellite modems (104 and 106) during upstream transmissions to network 230.

Downstream data from GW MAC layer block 204 is modulated using modulator 208. Modulation for downstream transmission in a DOCSIS based communications system used for cable applications is typically 64-QAM with 6 bits per symbol or 256-QAM with 8 bits per symbol. Satellite applications typically use QPSK, 8-PSK, or 16 QAM modulation. Modulation techniques are well known to those skilled in the relevant art(s). Although these modulation types are typical for the respective applications, the invention is relevant for any type of modulation. A symbol clock frequency used by modulator 208 is frequency-locked to the master reference frequency. Locking the symbol clock frequency to the master reference frequency (labeled $f_{GW\_reference}$) implies that the symbol frequency, indicated as $f_{baud}$ in FIG. 2, at all times is equal to:

$K_1 * f_{GW\_reference}$, where $K_1$ is a fixed number.

The modulated baseband data generated from modulator 208 is upconverted to a nominal desired downstream frequency. As shown in FIG. 2, the upconversion process is implemented in two stages using indoor unit upconverter 210 and outdoor unit upconverter 212. The invention is not limited to two stages for upconverting. In an alternative embodiment, one or more stages may used. The first stage, which uses indoor unit upconverter 210, upconverts the modulated baseband signal to an intermediate frequency. The second stage, which uses outdoor unit upconverter 212, upconverts the intermediate frequency to a nominal downstream carrier frequency, shown as $f_d$. The frequencies used to upconvert the modulated baseband signals need not be locked to the master reference frequency. This may result in a downstream signal having a carrier frequency that includes offset frequencies. These offset frequencies are labeled as $\Delta f_{GW\_IF}$, resulting from the first upconversion, and $\rho f_{Gwd}$, resulting from the second upconversion.

Downstream filter 214 and ortho-mode transducer 216 act in conjunction with each other to isolate signals received via antenna 108 from signals transmitted by antenna 108. Ortho-mode transducer 216 is used to transmit and receive signals on different polarizations. Thus, downstream filter 214 and ortho-mode transducer 216 enable the downstream carrier frequency and the symbol frequency to be filtered and transmitted via antenna 108 using a different polarization than that used for receiving signals via 108. (Ortho-mode transducers are commonly used in satellite applications, however the invention applies regardless of the mechanism of coupling the transmit and receive signals at the gateway). Thus, antenna 108 transmits the downstream center frequency (indicated as $f_d + \rho f_{Gwd}$) and the symbol frequency (indicated as $f_{baud}$) to one or more satellite modems (104/106) via satellite 112.

Figure 3:
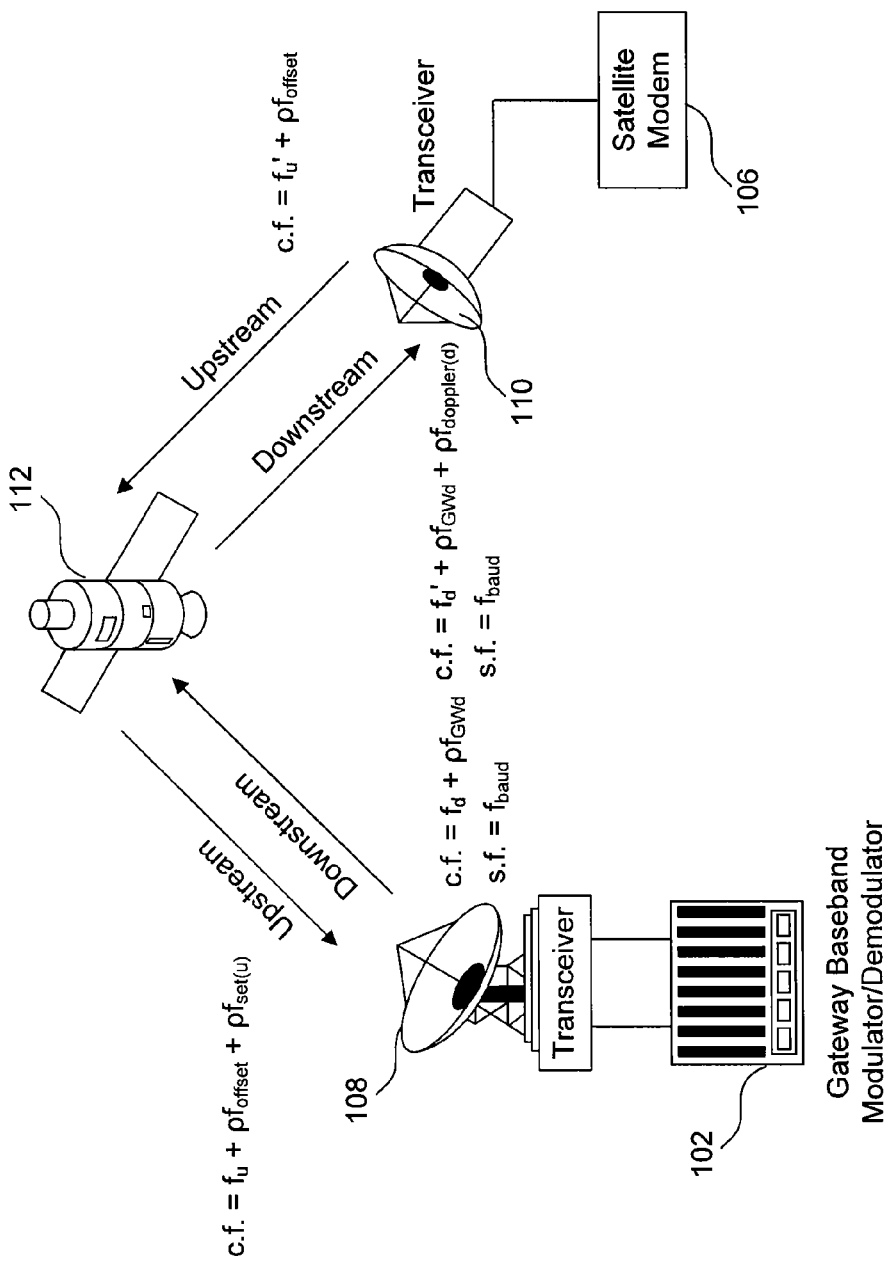
FIG. 3 is a block diagram illustrating a satellite channel.

FIG. 3 is a block diagram illustrating a satellite channel 300. Satellite channel 300 also includes the relevant upstream and downstream frequencies associated with satellite channel 300. Satellite channel 300 comprises, inter alia, satellite gateway 102, antenna 108, satellite 112, antenna 110, and satellite modem 106. The downstream center frequency and symbol frequency are transmitted from antenna 108 to satellite 112. Satellite 112 shifts the downstream center frequency. This results in a frequency represented by $f_d' + \rho f_{Gwd}$. Also, since the satellite is not truly stationery, but moves back and forth, a doppler shift may also occur. This doppler shift is indicated by $\rho f_{doppler(d)}$. Note that the symbol frequency is basically unchanged. The center frequency and the symbol frequency are then transmitted downstream from satellite 112 to satellite modem 106.

Figure 4:
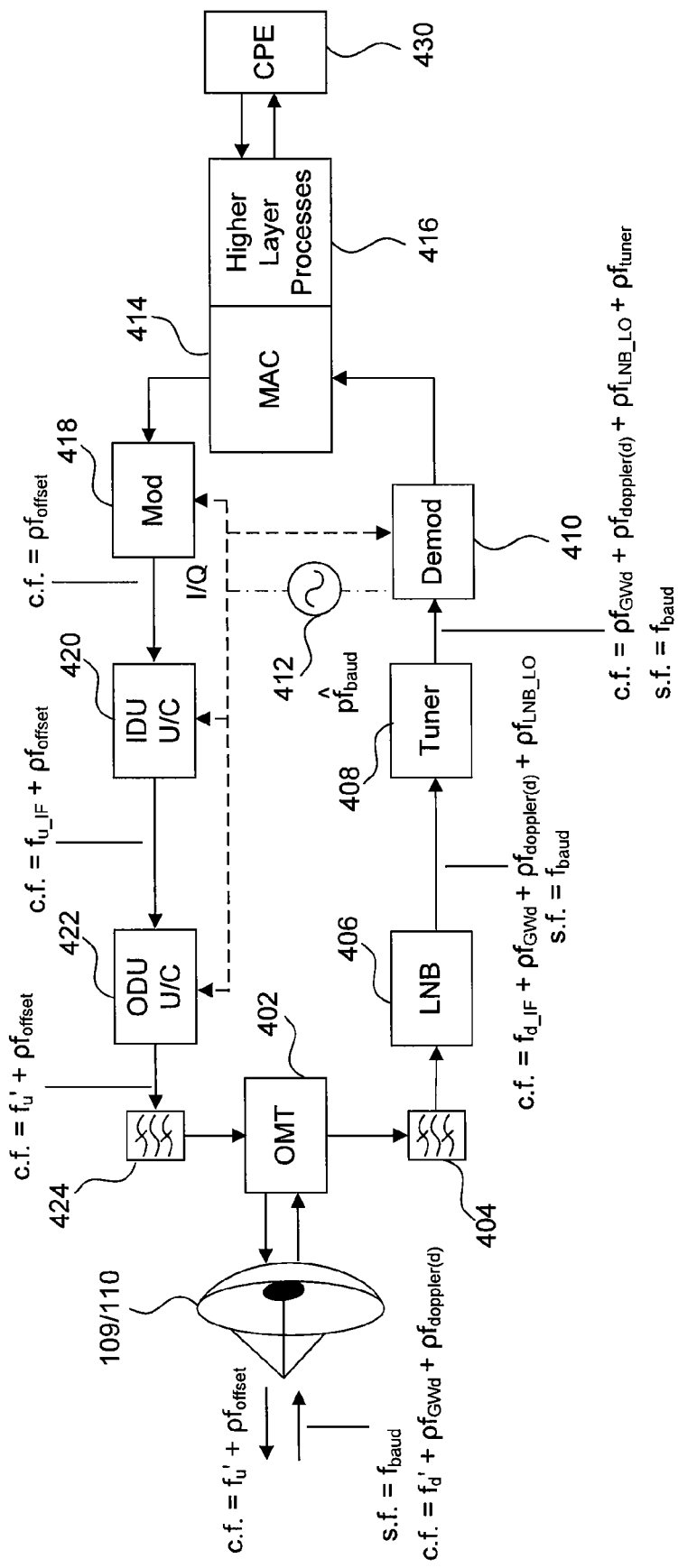
FIG. 4 is a block diagram illustrating the processing blocks for a satellite modem.

FIG. 4 is a block diagram illustrating the processing blocks for a satellite modem. FIG. 4 also illustrates the relevant upstream and downstream frequencies associated with a satellite modem, such as satellite modem 104 or 106. The processing blocks for the satellite modem 106 include antenna 110, an ortho-mode transducer 402, a downstream filter 404, a low noise block downconverter 406, a tuner 408, a demodulator 410, an oscillator 412, a satellite modem media access control (MAC) layer 414, higher layer processes block 416, an upstream modulator 418, an indoor unit upconverter 420, an outdoor unit upconverter 422, and an upstream filter 424.

Oscillator 412 generates a master reference frequency for the satellite modem. Oscillator 412 is coupled to demodulator 410, upstream modulator 418, indoor unit upconverter 420, and outdoor unit upconverter 422 to frequency and/or phase lock each of these components to the satellite modem master reference frequency. Alternatively, an external source could be used to provide the satellite modem master reference frequency.

The signal down linked from satellite 112 is received via antenna 110 and passed to ortho-mode transducer 402 and downstream filter 404. Ortho-mode transducer 402, in conjunction with downstream filter 404, operate to isolate the incoming downstream signal from an outgoing upstream signal via antenna 110. Ortho-mode transducer 402 receives the downstream signals on a different polarization than a signal being transmitted in the upstream. Thus, the center frequency and symbol frequency are received from satellite 112 via antenna 110 and passed through ortho mode transducer 402 and downstream filter 404 using a different polarization than that used for transmitting signals upstream via antenna 110. Note that ortho-mode transducers are commonly used in satellite applications, however the invention applies regardless of the mechanism for coupling the transmitted and received signals at the satellite modem.

The downstream signal is passed through low noise block downconverter 406, where the signal is amplified and downconverted to an intermediate frequency. Low noise block downconverter 406 includes a crystal which results in the addition of an offset frequency during the block downconversion. This offset frequency is indicated in FIG. 4 as $\rho f_{LNB\_LO}$. Thus, the center frequency is now represented by:

$c.f. = f_{d\_IF} + \rho f_{GWd} + \rho f_{doppler(d)} + \rho f_{LNB\_LO}$.

The downstream signal is passed through tuner 408. The goal of tuner 408 is to bring the downstream signal down to baseband. But in reality, as shown in FIG. 4, after being tuned, the center frequency still contains various offset frequencies, including an offset frequency contributed by tuner 408 ($\rho f_{tuner}$). Although the center frequency contains offset frequencies, the symbol frequency remains unchanged.

Figure 5:
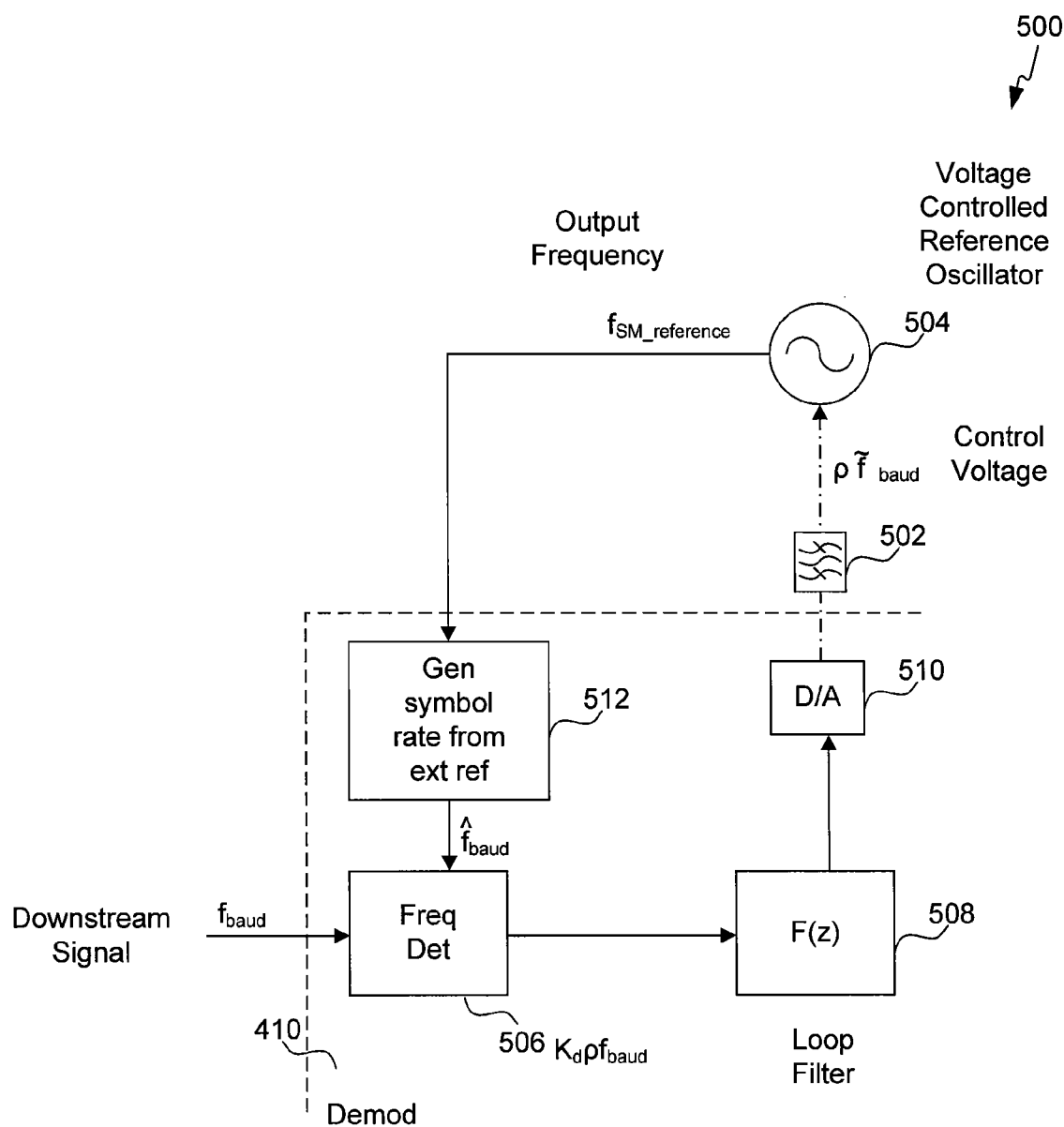
FIG. 5 is a block diagram illustrating the process of how a satellite modem frequency locks a satellite modem master reference to a recovered clock.

The downstream signal is then demodulated using demodulator 410. The satellite modem recovers the symbol frequency, $f_{baud}$, as part of the demodulation process. The satellite modem frequency or phase locks a satellite modem master reference to this recovered clock. FIG. 5 is a block diagram illustrating an example implementation of a frequency locked-loop 500 for locking the satellite modem master reference to the downstream symbol rate.

If a frequency locked loop, rather than a phase locked loop, is used, the typical frequency locked loop elements of demodulator 410 include, inter alia, a frequency detector 506, a loop filter (or digital filter) 508, a digital-to-analog (D/A) converter 510, and a baud clock generator 512. Frequency detector 506 is coupled to loop filter 508. Loop filter 508 is coupled to D/A converter 510. D/A converter 510 is coupled to filter 502. In the frequency locked loop implementation, the output of filter 502 is an error voltage that is proportional to the recovered baud clock error. This signal is coupled to voltage controlled reference oscillator 504. Voltage controlled reference oscillator 504 is coupled to baud clock generator 512. And baud clock generator 512 is coupled to frequency detector 506.

The downstream signal, $f_{baud}$, is input to frequency detector 506. Also input to frequency detector 506 is an estimated $f_{baud}$, or $\hat{f}_{baud}$. Initially, when the loop is not yet locked, $\hat{f}_{baud}$ is derived from the satellite modem reference. Frequency detector 506 provides a detector gain, and outputs the signal $K_d \rho f_{baud}$, where $K_d$ is representative of the gain factor and $\rho f_{baud}$ is equal to $f_{baud} - \hat{f}_{baud}$. This signal is filtered using loop filter 508 to reduce the effect of noise, and converted to an analog signal using D/A converter 510 to generate an analog control voltage, $\rho \hat{f}_{baud}$. The analog control voltage is used to control the frequency output of voltage controlled reference oscillator 504. Baud clock generator 512 is used to generate the recovered baud clock from the satellite modem's master frequency reference. Baud clock generator 512 uses the output frequency from voltage controlled reference oscillator 504 to generate the estimated symbol rate, $\hat{f}_{baud}$. As the control voltage, $\rho \hat{f}_{baud}$, increases, the output frequency will increase. The output frequency of the master frequency reference is increased or decreased by the control voltage until the estimated symbol rate $\hat{f}_{baud}$ is approximately equal to the gateway baud rate $f_{baud}$ (equivalently $\Delta f_{baud}$ is driven to approximately zero). At this point, the satellite reference frequency is locked to the gateway reference frequency.

Returning back to FIG. 4, after the signal is demodulated, MAC layer 414 and higher layer processes block 416 process the signal for transmission to a customer premises equipment (CPE) 430. This completes the downstream path.

In the upstream, a signal is sent from CPE 430 to the satellite modem and is processed by higher layer processes 416 and MAC layer 414 for upstream transmission to satellite gateway 102 in a similar manner as described above with reference to FIG. 2. Upstream data from MAC layer 414 is modulated using upstream modulator 418. Upstream modulator 418 is frequency locked to the satellite modem's master frequency reference, hence the modulator's output frequency does not contain an unknown frequency offset. However, the system can add an offset adjustment, $\rho f_{offset}$. This offset adjustment is based on data received from satellite gateway 102. For example, satellite gateway 102 could send satellite ephemeris or other equivalent data to enable the satellite modem to calculate $\rho f_{offset}$ necessary to compensate for any upstream doppler shift due to satellite motion relative to the satellite modem.

The upstream signal is upconverted using two stages. In the first stage, the upstream signal is upconverted to an intermediate upstream frequency, $f_{u\_IF}$, using indoor unit upconverter 420. In the second stage, the intermediate upstream frequency is further upconverted to $f_u'$ using outdoor unit upconverter 422. No offset frequencies are generated during the upconversion process because the upconverter units 420 and 422 are locked to the master satellite modem reference frequency.

The upconverted signal at $f_u'$ plus the $\rho f_{offset}$ is filtered and transmitted to satellite 112 via filter 424, ortho mode transducer 402, and antenna 110.

Returning to FIG. 3, the upstream signal is transmitted to satellite 112 at a center frequency of $f_u' + \rho f_{offset}$. Satellite 112 shifts the upstream signal from $f_u' + \rho f_{offset}$ to $f_u' + \rho f_{offset} + \rho f_{sat(u)}$, where $\rho f_{sat(u)}$ may be an error or doppler offset generated by satellite 112. The intent is to have $\rho f_{offset}$ be equal to $-\rho f_{sat(u)}$ in order for the two signals to cancel each other. The upstream signal from satellite 112 is then transmitted upstream to satellite gateway 102.

Returning to FIG. 2, the upstream signal is received by satellite gateway 102 at a center frequency of $f_u + \rho f_{offset} + \rho f_{sat(u)}$ via antenna 108 and transmitted upstream via ortho-mode transducer 216 using a different polarization than that used to transmit signals from satellite gateway 102 to a satellite modem. The upstream signal is filtered using filter 218. The filtered upstream signal is downconverted to an intermediate frequency using outdoor unit downconverter 220, and then downconverted to baseband using indoor unit downconverter 222. This leaves only the offset terms, which are intended to approximately cancel each other. No other offset terms are introduced in the upstream path because outdoor unit downconverter 220 and indoor unit downconverter 222 are both locked to the satellite gateway master reference frequency. The baseband signal is demodulated using burst demodulator 224, which is also frequency locked to the satellite gateway master reference frequency.

Figure 6:
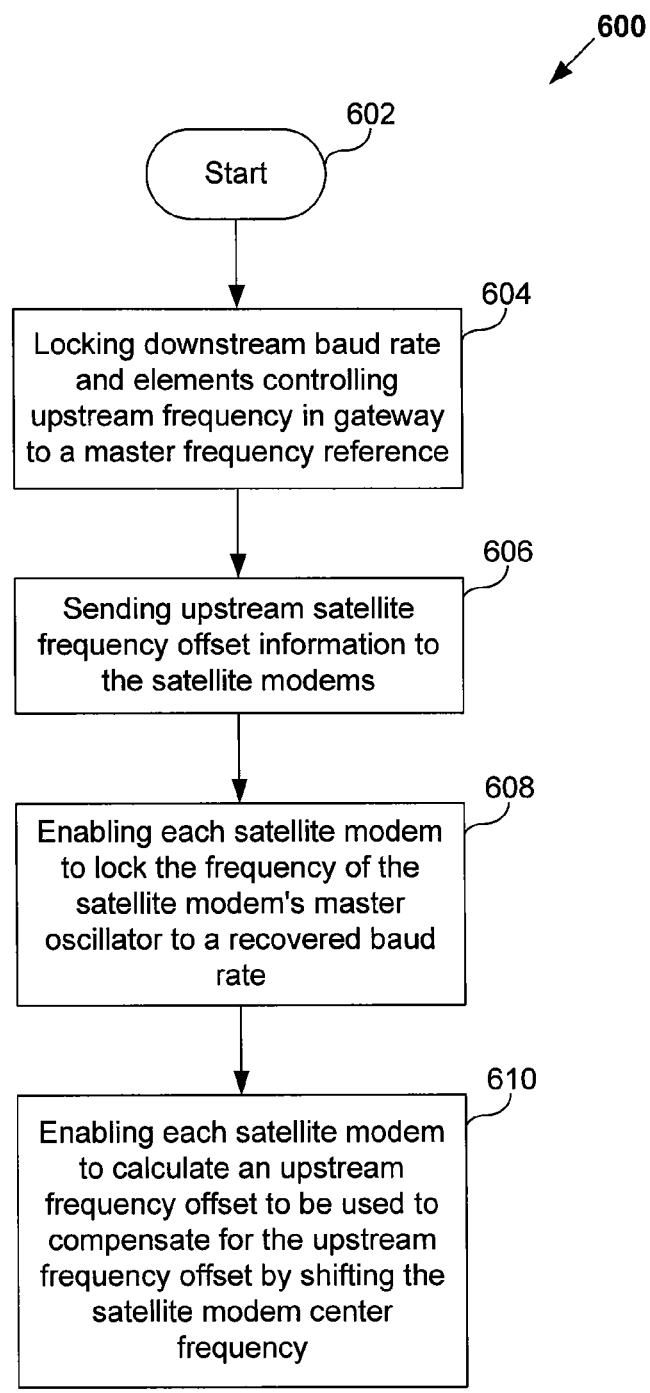
FIG. 6 is a flow diagram illustrating a method for minimizing the frequency error of satellite modem signals at a satellite gateway.

FIG. 6 is a flow diagram 600 illustrating a method for minimizing the frequency error of satellite modem signals at a satellite gateway. The invention is not limited to the description provided herein with respect to flow diagram 600. Rather, it will be apparent to persons skilled in the relevant art(s) after reading the teachings provided herein that other functional flow diagrams are within the scope of the present invention. The process begins with step 602, where the process immediately proceeds to step 604.

In step 604, the satellite gateway downstream baud (symbol) clock and elements that control the upstream frequency are locked to a satellite gateway master frequency reference. The elements in satellite gateway 102 that control the upstream frequency include the outdoor unit down converter 220, the indoor unit down converter 222, and the data burst modulator 224. The downstream baud clock is part of modulator 208. The process then proceeds to step 606.

In step 606, satellite gateway 102 sends upstream satellite frequency offset information to satellite modems, such as satellite modems 104 and 106. Such information may include, but is not limited to, satellite ephemeris, which can be used to calculate Doppler offset. Note that step 606 is not required if it is known that the doppler or other frequency errors due to the satellite in the upstream path are sufficiently small. The process then proceeds to step 608.

In step 608, each satellite modem is enabled to lock the frequency of each satellite modem's master oscillator to a recovered baud rate. This can be accomplished by using a frequency or phase locked loop. The process then proceeds to step 610.

In step 610, each satellite modem is enabled to calculate an upstream satellite frequency offset. Note that step 610 is not implemented unless step 606 is implemented. This offset is used to compensate for upstream frequency offsets by shifting the center frequency of each satellite modem. Each satellite modem uses its own master oscillator to generate the carrier frequency for the upstream frequency up conversion.

Conclusion

The previous description of the preferred embodiments is provided to enable any person skilled in the art(s) to make or use the present invention. While the invention has been particularly shown and described with reference to preferred embodiments thereof, it will be understood by those skilled in the art that various changes in form and detail may be made therein without departing from the spirit and scope of the invention.

What is claimed is:

1. A method for minimizing frequency error of a satellite modem at a satellite gateway, comprising:
   (a) downconverting by said satellite modem a downstream signal using a first oscillator;
   (b) recovering by said satellite modem a downstream symbol rate from said downstream signal;
   (c) enabling said satellite modem to lock a satellite modem's master oscillator to said downstream symbol rate;
   (d) locking elements controlling upstream frequency to said satellite modem's master oscillator;
   (e) sending upstream satellite frequency offset information from said satellite gateway to said satellite modem; and
   (f) enabling said satellite modem to calculate an upstream frequency offset based upon said upstream satellite frequency offset information, wherein said upstream satellite frequency offset is compensated for by shifting a center frequency for said satellite modem's master oscillator,
   wherein said first oscillator is not locked to said satellite modem's master oscillator, whereby frequency offsets introduced during said step (a) do not change said downstream symbol rate.

2. The method of claim 1, wherein step (d) further comprises:
   generating carrier references for upstream frequency up-conversions by said satellite modem's master oscillator.

3. The method of claim 1, wherein step (c) further comprises:
   locking satellite modem's master oscillator to said downstream symbol rate using a frequency or a phase locked loop.

4. The method of claim 1, wherein step (e) further comprises:
   an upstream frequency error due to a satellite is sufficiently small to prevent said upstream satellite frequency offset information from said satellite gateway from being sent to said satellite modem.

5. The method of claim 1, wherein an upstream frequency error due to a satellite is sufficiently small to prevent said upstream satellite frequency offset from shifting said center frequency for said each satellite modem's master oscillator.

6. The method of claim 1, wherein said step (d) occurs before said step (e).

7. The method of claim 1, wherein said step (e) further comprises:
   sending satellite ephemeris or doppler offset generated by a satellite from said satellite gateway to said satellite modem.

8. The method of claim 1, wherein said step (d) further comprises:
   locking an outdoor unit upconverter, an indoor unit upconverter, or an upstream modulator to said satellite modem's master oscillator.

9. The method of claim 1, wherein step (a) further comprises:
   downconverting by said satellite modem said downstream signal using said first oscillator to a baseband frequency.

10. The method of claim 1, further comprising after step (a):
    downconverting by said satellite modem said downstream signal using a second oscillator, wherein said second oscillator is not locked to said satellite modem's master oscillator, whereby frequency offsets introduced during said of downconverting by said satellite modem said downstream signal using said second oscillator do not change said downstream symbol rate.

11. The method of claim 10, wherein said step of downconverting by said satellite modem said downstream signal using a second oscillator further comprises:
    downconverting by said satellite modem said downstream signal using said second oscillator to an intermediate frequency.

12. A satellite modem configured to receive a downstream signal and upstream satellite frequency offset information from a satellite gateway, said satellite modem calculates an upstream frequency offset based upon upstream satellite frequency offset information, comprising:
    a tuner including a first oscillator, wherein said tuner downconverts said downstream signal using said first oscillator;
    a downstream demodulator, wherein said downstream demodulator recovers a downstream symbol rate from said downstream signal;
    a master oscillator coupled to said downstream demodulator, wherein said master oscillator is locked to said downstream symbol rate, said master oscillator compensates for said upstream satellite frequency offset by shifting a center frequency, wherein said first oscillator is not locked to said satellite modem's master oscillator, whereby frequency offsets introduced by said tuner do not change said downstream symbol rate; and
    an upstream modulator coupled to said master oscillator, wherein said upstream modulator is locked to said master oscillator.

13. The satellite modem of claim 12, further comprising at least one of:
    an outdoor unit upconverter, wherein said outdoor unit upconverter is locked to said master oscillator; and
    an indoor unit upconverter, wherein said indoor unit upconverter is locked to said master oscillator.

14. The satellite modem of claim 12, further comprising an antenna configured to receive said downstream signal and said upstream satellite frequency offset information from said satellite gateway.

15. The satellite modem of claim 12, wherein said master oscillator generates carrier references for upstream frequency up-conversions.

16. The satellite modem of claim 12, wherein said master oscillator further comprises a frequency or a phased locked loop to lock said master oscillator to said downstream symbol rate.

17. The satellite modem of claim 12, wherein an upstream frequency error due to a satellite is sufficiently small to prevent frequency offset information from being sent.

18. The satellite modem of claim 12, wherein an upstream frequency error due to a satellite is sufficiently small to prevent upstream frequency offset correction.

19. The satellite modem of claim 12, wherein said upstream satellite frequency offset information comprises at least one of:

satellite ephemeris; and doppler offset generated by a satellite.

20. The satellite modem of claim 12, wherein said tuner downconverts said downstream signal to a baseband frequency.

21. The satellite modem of claim 12, further comprising:

a low noise block downconverter including a second oscillator, wherein said low noise block downconverter downconverts said downstream signal using said second oscillator, whereby frequency offsets introduced by said low noise block downconverter do not change said downstream symbol rate.

22. The satellite modem of claim 21, wherein said low noise block downconverter downconverts said downstream signal using said second oscillator to an intermediate frequency.

* * * * *